Nov. 11, 1924.

C. R. SUNDBOOM 1,514,876

POWER TAKE-OFF FOR FORDSON TRACTORS

Filed June 11, 1923

INVENTOR.
CLARENCE R. SUNDBOOM.
BY HIS ATTORNEY.

Patented Nov. 11, 1924.

1,514,876

UNITED STATES PATENT OFFICE.

CLARENCE R. SUNDBOOM, OF ST. PAUL, MINNESOTA.

POWER TAKE-OFF FOR FORDSON TRACTORS.

Application filed June 11, 1923. Serial No. 644,588.

*To all whom it may concern:*

Be it known that I, CLARENCE R. SUNDBOOM, a citizen of the United States, residing at St. Paul, in the county of Ramsey and State of Minnesota, have invented certain new and useful Improvements in Power Take-Offs for Fordson Tractors; and I do hereby declare the following to be a full, clear, and exact description of the invention, such as will enable others skilled in the art to which it appertains to make and use the same.

This invention relates to a tractor and particularly to an attachment for the tractor designed for the purpose of taking power therefrom or for driving various accessories from the tractor. In the well known Fordson type of tractor and others, a power shaft is provided which is substantially horizontal and projects from one side of the tractor frame, being usually equipped with a belt pulley. A serious objection exists to said power device in that power can only be taken therefrom in direct line with the pulley and it is necessary to accurately aline the tractor with the pulley which is to be driven by the pulley on the power shaft. Power thus cannot be delivered from said shaft at any or various angles thereto and in many desirable applications of the power the driving wheels of the tractor and the body thereof are in the way. It is frequently desirable to draw certain other machines or devices by the tractor and at the same time to apply power thereto.

It is an object of this invention, therefore, to provide an attachment which readily may be applied to the standard Fordson or other tractor by means of which power can be taken from the tractor at various angles and a belt can be driven from the tractor which may run in any direction therefrom.

It is a further object of the invention to provide such an attachment having a pulley carrying shaft disposed above the wheels and body of the tractor, which shaft is rotatable about a vertical axis so that the same may be turned in any direction and held fixed in suitable position.

These and other objects and advantages of the invention will be fully set forth in the following description made in connection with the accompanying drawings in which like reference characters refer to the same parts throughout the different views, and in which,—

Figure 1:
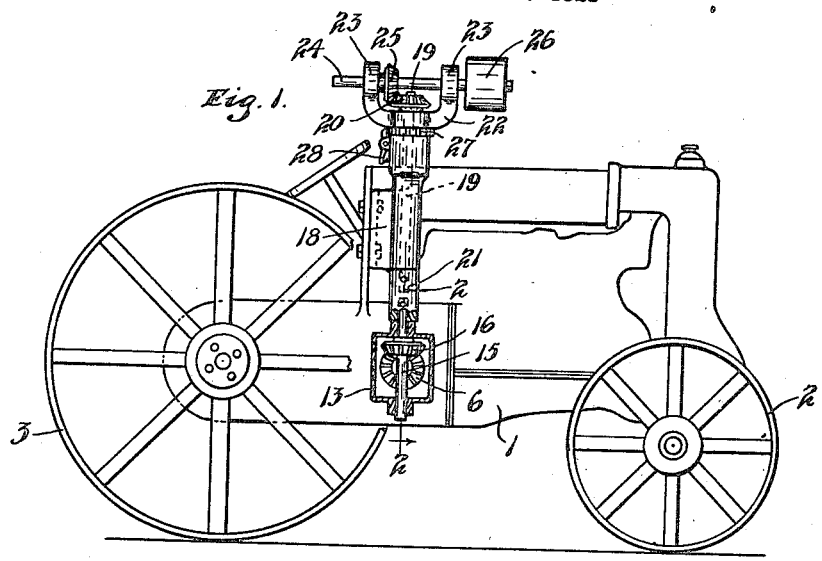
Fig. 1 is a view in side elevation of a tractor of well known Fordson type having the invention applied thereto, a portion thereof being shown in section.
Figure 2:
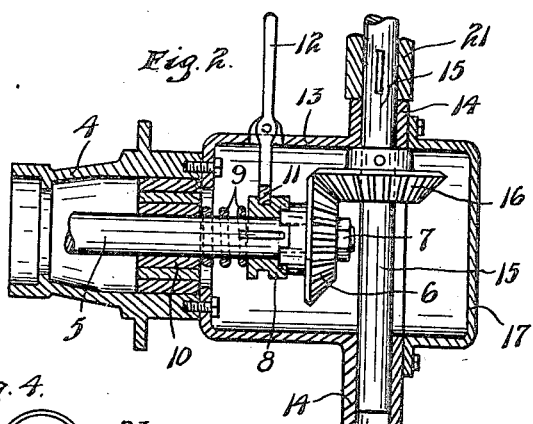
Fig. 2 is a vertical section taken on the line 2—2 of Fig. 1, as indicated by the arrows.
Figure 4:
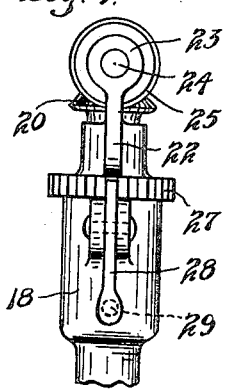
Fig. 4 is a view in elevation of the device as seen from the left of Fig. 3, Figs. 2, 3 and 4 being shown on an enlarged scale.
Figure 3:
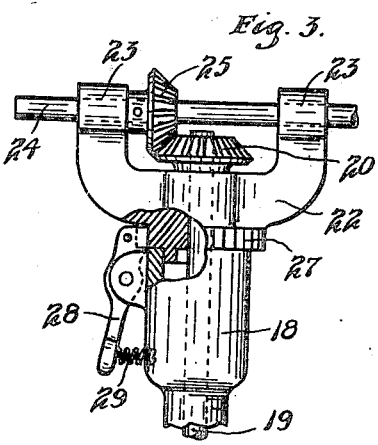
Fig. 3 is a view in side elevation partly in vertical section of the top portion of the device.

Referring to the drawings, a tractor of well known Fordson type is illustrated comprising the frame or body portion 1, the front wheels 2 and the rear driving wheels 3. Such tractors are usually provided with an accessory comprising a bracket adapted to be bolted to the side of the tractor through which passes a power shaft and a driving pulley is driven by said shaft at the outer end of said bracket. In accordance with the present invention, the pulley bracket is removed and a bracket shown as the bracket 4 is used which is bolted to the side of the tractor. The power shaft 5 extends through this bracket and is driven by being connected at its inner end with the tractor transmission mechanism. A beveled gear 6 is journaled upon the outer end of the shaft 5, being held thereon by a collar 7 fastened to the end of the shaft by a set screw or other suitable means. The gear 7 has its hub formed with teeth to provide a half clutch and another half clutch member 8 is splined to the shaft 5 so as to be slidable thereon and contacted by a coiled compression spring 9 surrounding the shaft 5 and bearing against a bearing 10 at one end, which bearing is rigidly secured to said bracket 4. The clutch member 8 is engaged by a clutch fork 11 having projecting therefrom a handle lever 12 intermediately pivoted to a lug formed on a housing bearing 13. The housing bearing 13 is adapted to fit against the outer surface of the bracket 4 and said bearing and bracket are provided with alining circumferentially spaced holes so that the said bearing 13 may be secured to the bracket 4 in a plurality of different circumferential positions. The housing bearing 13 has alined bearing portions 14 therein in which is journaled a shaft 15 having secured thereto a beveled gear 16 which meshes with the beveled gear 6. The housing bearing 13 is provided with an outer closing cap 17 bolted thereto. The shaft 15 projects a slight distance above the upper bearing 14 and is provided with a key by which it may be attached to any suitable transmission mechanism. With the described structure it is seen that the bearing 13 can be secured in various positions so that the shaft 15 will extend to various angles at each side of the vertical.

Another bracket 18 is provided having a flange adapted to be bolted to the tractor frame. A vertical shaft 19 is journaled in this bracket and has secured to its upper end a beveled gear 20 and is keyed at its lower end to a sleeve 21. The sleeve 21 may extend between the bracket 18 and the top of the bearing 14 and will then be pinned to the top of the shaft 15. The bracket 18 is enlarged at its upper end and has seated thereon and journaled therein a bracket 22 having spaced upwardly extending arms formed as bearings 23 in which is journaled a substantially horizontal shaft 24. The shaft 19 extends through and is journaled in the bracket 22 and a beveled gear 25 is secured to the shaft 24 and meshes with the beveled gear 20. The shaft 24 has a pulley 26 secured at one end thereof outside of one of the bearings 23. The bracket 22 has a depending sleeve fitting in and journaled in the upper portion of the bracket 18 and is provided at the top of said bracket with circumferential teeth 27. Said teeth are engaged by the pawl tooth formed on the upper end of a lever 28 pivoted in spaced lugs projecting from the upper portion of bracket 18, which lever is spring-pressed to hold said pawl tooth in engagement with said teeth by a compression coiled spring 29. The lower part of lever 28 is formed as a handle which may be pressed to withdraw the pawl tooth of said lever from the teeth 27.

In operation, the power attachment can be used with or without the bracket 18 and the parts carried thereby and the sleeve 21. It is sometimes desirable to draw another machine or device by the tractor or to push such a machine or device ahead of the tractor. When the machine is so drawn or pushed, such as a street sweeper, the bearing 13 may be secured in position with the shaft 15 extending at an angle to the front or rear of the tractor. The universal joint and shaft can then be connected to the upper end of the shaft 15, and the power thus transmitted to a device at the front or rear of the tractor. When the bracket 18 and sleeve 21 are employed a power pulley is provided above the tractor wheels and body which can be connected by a belt to a device located in any direction from the tractor. The bracket 22 can be turned, as desired, and held in any desired position by means of the pawl lever 28. It is thus unnecessary to aline the tractor accurately with the pulley of the driven device. The driving belt from pulley 26 can extend at any desired angle and will never be interfered with by the body or wheels of the tractor. Power can be applied to the shaft 15 and to the pulley 26 as desired by manipulating the clutch 8 by the lever 12 so that it will not be necessary to stop the motor of the tractor in order to discontinue the application of power.

From the above description it is seen that applicant has provided a very simple and efficient attachment for a tractor of the Fordson or other type, which attachment can readily and quickly be applied to or removed from the tractor. The said attachment has a high degree of utility for taking power from the tractor and the application of this power to various uses. It also has great utility in driving certain machines which are propelled by the tractor. The parts of the device are comparatively few, easily made and the device can be installed at small expense. The device has been used on a number of machines and found to be very successful and efficient.

It will, of course, be understood, that various changes may be made in the form, details, arrangement and proportions of the parts without departing from the scope of applicant's invention, which, generally stated, consists in a device capable of carrying out the objects above stated and such as shown and described and set forth in the appended claims.

What is claimed is:

1. The combination with a Fordson or other tractor having a power shaft projecting from the side thereof, of a bracket surrounding said shaft and secured to the side of the tractor, a bearing secured to said bracket, a shaft journaled in said bearing, means connecting the ends of said shafts, said bearing being adjustable into a plurality of different circumferential positions whereby said last mentioned shaft can extend at various angles at each side of the vertical, and a third shaft extending at right angles to said second mentioned shaft and movable about the axis thereof for transmitting power therefrom.

2. The combination with a Fordson or other tractor having a power shaft projecting from the side thereof, of a bracket surrounding said shaft and secured to said tractor, a housing bearing constructed and arranged to be secured to said bracket in a plurality of circumferential positions, a beveled gear on said power shaft, a vertical shaft journaled in said housing bearing, a beveled gear thereon meshing with said beveled gear, said latter shaft projecting from said housing bearing, a third shaft extending at right angles to said vertical shaft, beveled gears connecting said last mentioned shafts, and a member carried by said housing bearing and revoluble thereon carrying said third shaft and one of said last mentioned beveled gears.

3. The combination with a Fordson or other tractor having a power shaft projecting from the side thereof, of a bracket surrounding said shaft and secured to the tractor, a bearing secured to said bracket, a substantially vertical shaft journaled in said bearing, driving means connecting said last mentioned shaft and said power shaft, a bracket secured to the side of the tractor, a vertical shaft journaled therein driven by said last mentioned vertical shaft, a bracket carried at the top of said last mentioned bracket and being rotatable thereon, a substantially horizontal shaft journaled in said last mentioned bracket, a driving connection between said horizontal shaft and said last mentioned vertical shaft, a pulley secured to said horizontal shaft, and means for holding said last mentioned bracket in fixed position whereby said horizontal shaft and pulley may be turned through an angle of 360 degrees so that power may be delivered to the side of the tractor.

4. The combination with a Fordson or other tractor having a power shaft extending from the side thereof, of a bracket secured to the side of said tractor, a vertical shaft journaled therein and driven from said power shaft, a horizontal shaft disposed above the tractor wheels and body and driven from said vertical shaft, said horizontal shaft being rotatable about a vertical axis, and means on said horizontal shaft for delivering power therefrom in any direction.

5. The combination with a Fordson or other tractor having a power shaft extending therefrom, of a bracket secured to said tractor, a vertical shaft journaled therein, driving means connecting said vertical shaft to said power shaft, a rotatable bracket journaled about a vertical axis in the top of said bracket, a horizontal shaft journaled in said last mentioned bracket, beveled gears connecting said vertical shaft and said horizontal shaft, a pulley on said horizontal shaft, and locking means for holding said last mentioned bracket in any one of a plurality of circumferential positions.

6. The structure set forth in claim 5, said last mentioned means comprising teeth formed on said rotatable bracket, and a spring operated pawl lever secured to said first mentioned bracket and engaging said teeth.

7. The combination with a Fordson or other tractor, having a power shaft extending therefrom, of a beveled gear journaled on said power shaft, a clutch for connecting said beveled gear and shaft, manual means for operating said clutch, a bearing secured to said bracket and attachable in a plurality of circumferentially spaced positions, a vertical shaft journaled in said bearing and having a beveled gear secured thereto meshing with said beveled gear, said vertical shaft projecting from said bearing and having means thereon adapted to be connected to a transmission mechanism, a second bearing secured to said tractor, a vertical shaft journaled therein and connected to said first mentioned vertical shaft, a rotatable bracket journaled about a vertical axis in the top of said last mentioned bearing, a substantially horizontal shaft journaled in said rotatable bracket, a pulley secured to said horizontal shaft, driving means connecting said horizontal shaft and said last mentioned vertical shaft, and means for holding said rotatable bracket in any one of a plurality of positions.

8. The combination with a Fordson or other tractor having a power shaft projecting from the side thereof, of a second shaft extending at right angles to and driven from said shaft and revoluble about the axis thereof, a third shaft extending at right angles to and driven by said second shaft and revoluble about the axis thereof, and means for transmitting power from said third shaft.

In testimony whereof I affix my signature.

CLARENCE R. SUNDBOOM.